Sept. 8, 1964 J. A. FAGNANT 3,148,128
ADJUSTABLE SLOPE CHAR OVEN
Filed July 10, 1961 3 Sheets-Sheet 1
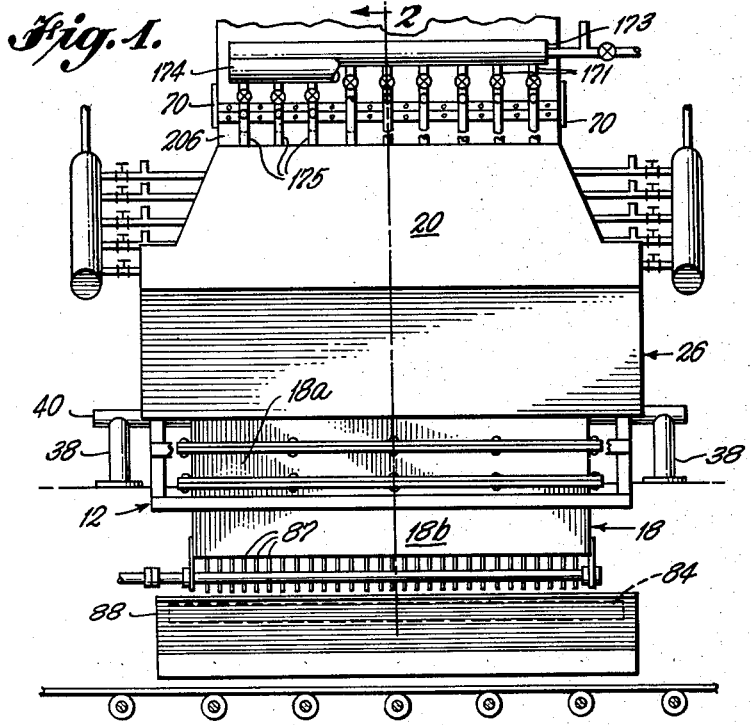
Fig. 1.
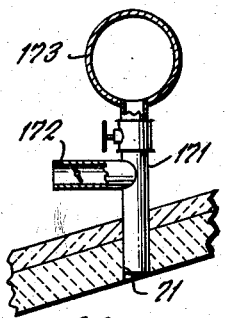
Fig. 9.
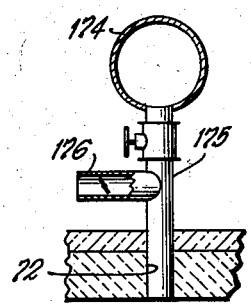
Fig. 10.
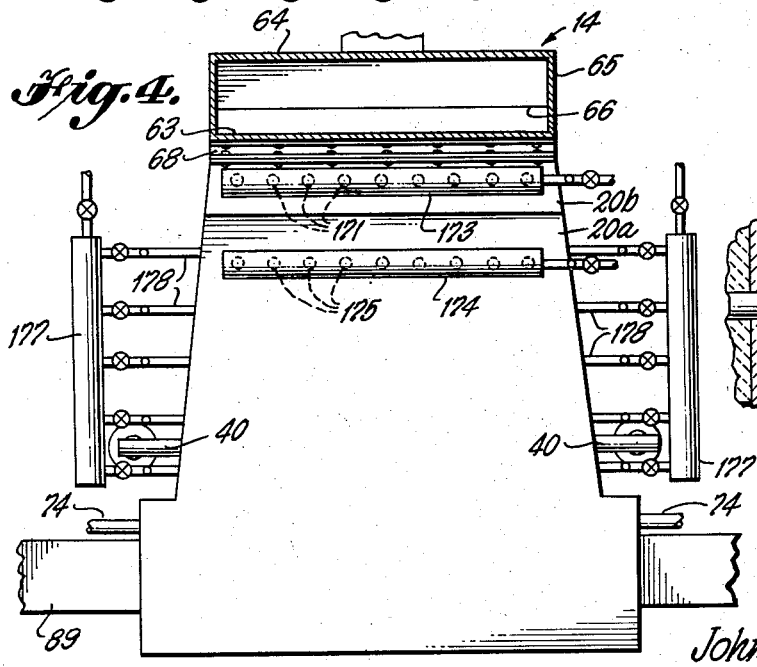
Fig. 4.
Fig. 11.
INVENTOR
John A. Fagnant
BY Shoemaker and Mattare
ATTORNEYS

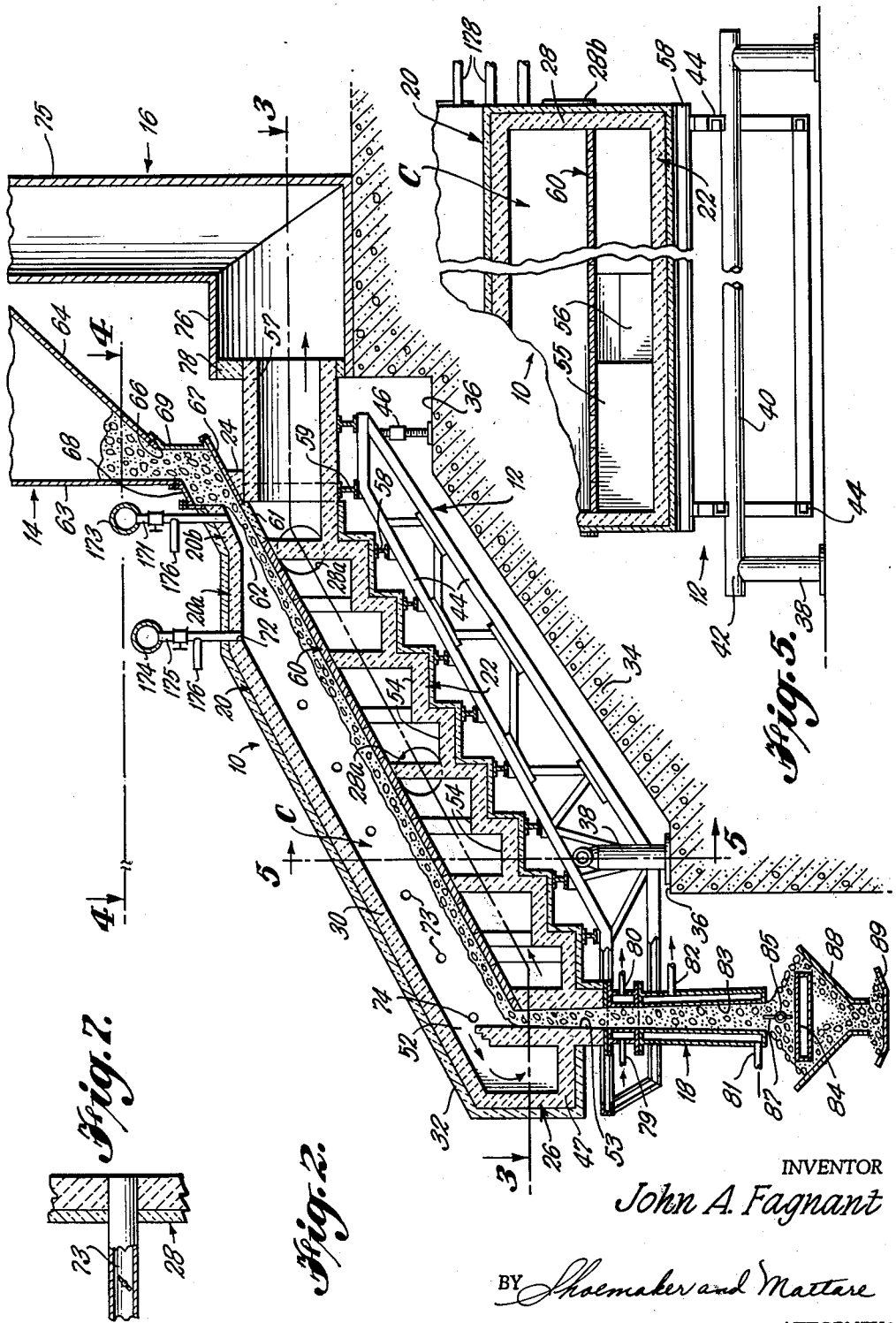

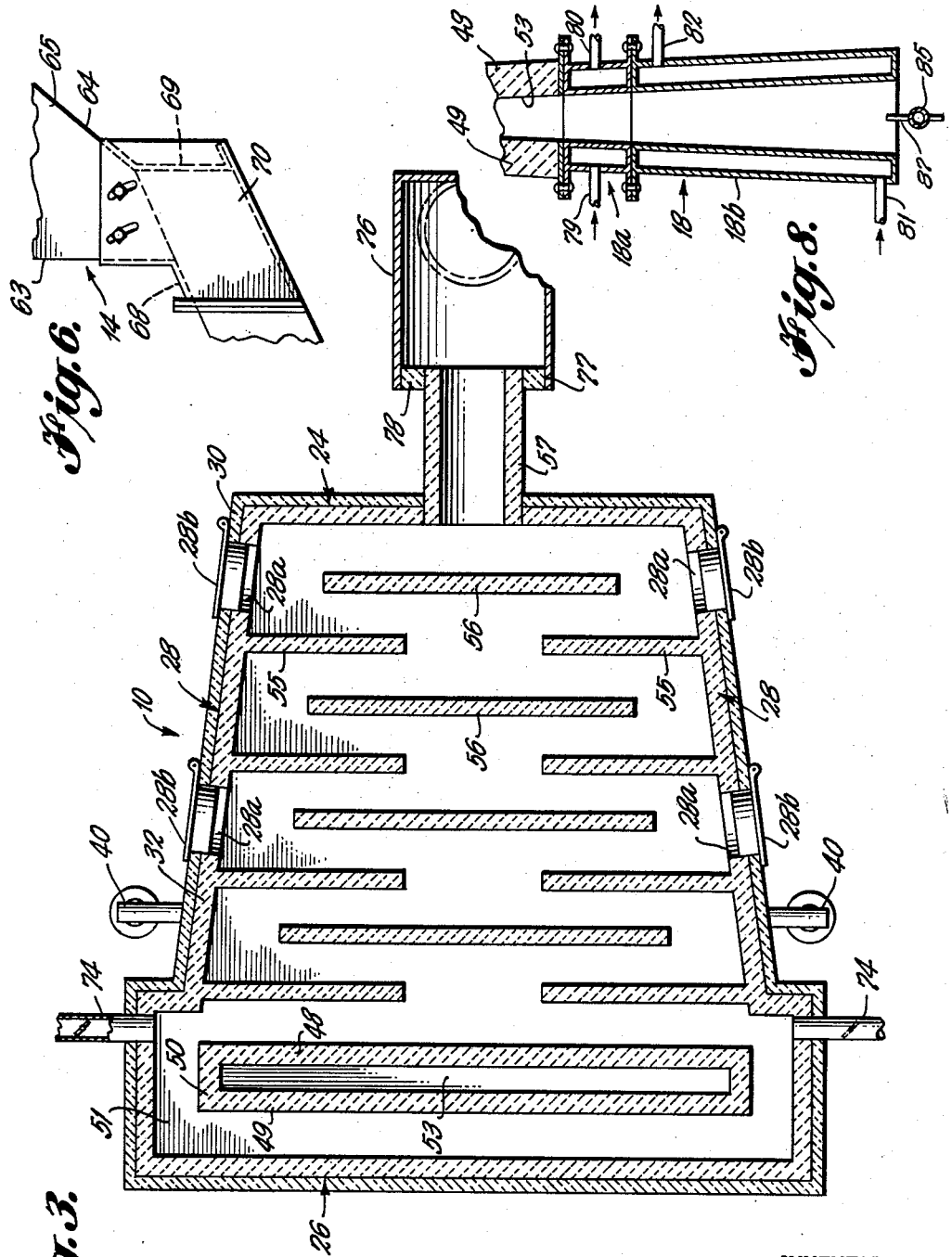

United States Patent Office 3,148,128
Patented Sept. 8, 1964

3,148,128
ADJUSTABLE SLOPE CHAR OVEN
John A. Fagnant, Kemmerer, Wyo., assignor to The Kemmerer Coal Company, Frontier, Wyo., a corporation of Wyoming
Filed July 10, 1961, Ser. No. 122,935
12 Claims. (Cl. 202—129)

This invention relates to chemical reaction apparatus and methods and is directed particularly to an improved structure and method of operating the same for the production of fuel gases, tar vapor and carbonaceous solid residue or char.

The present invention has for a broad or primary object to provide a new and novel method and apparatus for continuously carrying out endothermic chemical reactions involving a solid material having gas forming and liquefiable constituents, and as gaseous substance.

In the fuel converting art use has up to the present time been made of large reaction vessels which require heat transfer at high temperatures wherein such vessels are made of refractory fire brick or high temperature alloy metals.

Refractory fire brick settings used in such reaction vessels have low thermal conductivity and, therefore, transmit heat relatively slowly compared with the heat transfer rate through metals. However, in the use of metallic reaction vessels there is a definite maximum temperature limit which restricts the flexibility of the process.

Another object of the present invention, in the light of the foregoing, is to provide an improved apparatus constructed in a novel manner and employing a new heat transferring material by means of which heat diffusion through the material is more efficiently obtained and the restrictions and problems associated with presently known apparatus are definitely overcome.

A further object of the invention is to provide, in a manner hereinafter set forth, a reaction apparatus embodying a new and novel combustion chamber design wherein the floor structure thereof is such that temperature limits which may be obtained within the chamber lie high above the maximum temperature limits obtainable in metallic reaction vessels.

A further and more specific object of the invention is to provide a new and novel type of oven structure designed to effect gravitational movement of the raw material under treatment and wherein novel means is provided for modifying the degree of slope or inclination of the combustion chamber to facilitate obtaining the angle of inclination of the floor over which the material passes, most desirable or most efficient for moving the raw material under treatment through the combustion zone or chamber.

Still another object of the invention is to provide apparatus of the character stated wherein there is provided a novel preheat zone or area designed for the introduction of an air purge to move into the combustion zone water vapor and volatiles extracted from the raw material.

Still another object of the present invention is to provide a new and novel refractory oven structure of the type hereinafter set forth, wherein there is provided an inclined combustion chamber having an inclined floor formed of a material having a high degree of thermal conductivity with means for conveying products of combustion to the underside of the floor for the transfer of heat through the floor to material thereon; whereby there is no critical temperature limit to the process carried out in the oven and also whereby the floor construction allows for good heat transfer therethrough for effecting uniform carbonization to take place through the layer of carbonaceous material moving over the floor surface.

More particularly the present invention has for an important object to provide the material supporting and heat transfer surface over which the carbonaceous material is moved, of silicon carbide, preferably in the form of slabs.

A still further object of the invention is to provide a novel oven structure for carbonizing carbonaceous material wherein a novel soaking pit construction is provided with means for conducting therearound hot gaseous products of combustion from the combustion chamber and then carrying off such products of combustion along the underside of the oven floor whereby the material on the floor will be subjected to heat from the underside thereof through the floor.

Other objects of the invention, which will become apparent from the following description of the structure and operation thereof, are to provide means for producing low volatile char for chemical and metallurgical operations; to provide a novel combustion system with flexible controls whereby to achieve the desired reaction without forming coke deposits caused by cracking or dissociation of hydrocarbon materials, and to provide apparatus whereby smokeless fuels may be produced from the carbonaceous materials.

The invention will be best understood from a consideration of the following detailed description taken in connection with the accompanying drawings forming a part of this specification with the understanding, however, that the invention is not confined to a strict conformity with the showing of the drawings but may be changed or modified so long as such changes or modifications mark no material departure from the salient features of the invention as defined by the appended claims.

In the drawings:

FIG. 1 is a view in front elevation of an oven structure constructed in accordance with the present invention.

FIG. 2 is a sectional view taken in a vertical plane substantially on the line 2—2 of FIG. 1.

FIG. 3 is a sectional view taken substantially on the line 3—3 of FIG. 2.

FIG. 4 is a sectional view taken substantially on the horizontal plane indicated by section line 4—4 of FIG. 2.

FIG. 5 is a vertical section taken substantially on the line 5—5 of FIG. 2.

FIG. 6 is a detail illustrating a side plate connected between the lower part of the hopper and the intake or throat portion of the oven.

FIG. 7 is a sectional detail on an enlarged scale through an air admission port showing a control valve therein.

FIG. 8 is a large scale view of the sectioned cooler structure shown in FIG. 2.

FIGS. 9, 10 and 11 show on an enlarged scale sectional details illustrating plenum chambers or headers from which air under pressure may be supplied to the different inlets of the furnace and also illustrating means for admitting air at atmospheric pressure only to the associated inlets.

The apparatus for the present invention, hereinafter more particularly described, provides for the carrying out of an endothermic chemical reaction process involving a solid fuel and a gaseous or vaporous substance and in the operation of such apparatus the solid material is introduced into an oven through a feed throat or slot and onto the surface of a sloping floor of the combustion chamber, which floor is formed of material having a high degree of thermal conductivity, more specifically, silicon carbide preferably in the form of slabs or tile.

The oven structure is in the general form of a long, wide and flat body and is supported at an inclination into the horizontal and air for combustion is introduced into the oven structure along the sides of and over the bed of material on the sloping floor surface and across the top of the bed, into a combustion chamber. Also air is introduced into the restricted throat portion leading into the combustion chamber in which restricted throat portion the carbonaceous material is dried and preheated relatively slowly and the air introduced into this preheat throat section functions as a purge to move water vapor and volatiles into the combustion zone. By maintaining a relatively thin, continuous bed of the solid material flowing or moving by gravity down the sloping surface of the silicon carbide floor, a simple and practical method of carbonizing any carbonaceous material is provided. The volatile hydrocarbons burning above the moving bed of the solid material provides a superior means of transferring heat to such material by reason of the novel construction of the furnace whereby maximum utilization of radiant heat from the flames is obtained whereby a large degree of carbonization will be effected. The hot combustion gases plus excess gases and tar vapors are passed from the combustion zone through a suitable hot gas duct encircling the discharge outlet for the char, which outlet forms a soaking pit and by this means the soaking pit or zone is kept at a uniform temperature. Such hot gases are then passed into an area below and distributed over the underside of the silicon carbide floor for the transfer of heat through the same into the bed of material on the top of the floor. From this area the gases are then passed to an exhaust stack.

Means is provided for introducing additional air to raise the temperature of the gasses in the area beneath the silicon carbide floor as well as means being provided for introducing air into the combustion zone or chamber above the floor and the material thereon. The high heat transfer properties of the silicon carbide forming the floor structure over which the bed of material moves, provide the necessary heat for carbonizing the solid material in contact with the floor.

Referring now more particularly to the drawings the apparatus illustrated and about to be described is designed primarily for the production of low volatile char with no provision for gas or liquefiable vapor recovery. It will be readily apparent, however, that the invention is not necessarily limited in this respect since provision may be readily made for the recovery of gas or liquefiable vapors passing from the exhaust neck into the illustrated exhaust stack.

The apparatus is also designed to be mounted upon a suitable supporting truss structure in such a manner as to facilitate altering the degree of inclination of the oven and more particularly the floor of the oven so that the rate of movement under the action of gravity of material over the floor surface may be regulated in accordance with the particle size of the material and in order to regulate the depth of the bed of material to obtain the most efficient operation of the apparatus. In the structure illustrated the numeral 10 generally designates the oven which is supported upon a tiltable truss structure generally designated 12. The oven is supported at an inclination as shown and at the top or high end there is mounted upon a suitable support, not shown, the fixed or stationary material feed hopper generally designated 14.

The numeral 16 generally designates the exhaust stack into which the products of combustion are conveyed. At the lower end of the oven structure is located the cooler which is generally designated 18 and into and through which the char passes when discharged from the soaking pit located at the lower end of the oven floor.

The oven structure, as shown particularly in FIGS. 1 and 4, is an elongate relatively wide body and as shown in FIG. 2, its height is relatively small as compared to its length and width. The top wall or roof of the oven structure is generally designated 20, while the bottom wall is generally designated 22. The numerals 24 and 26 generally designate rearward and forward end walls respectively and the side walls are generally designated 28. All of the walls are made in two layers, the inner layer which is designated 30 for all of the walls, being of refractory material while the outer layer which is designated 32 for all of the walls, is of insulation material of a suitable type. The refractory material and insulation material may be of any of the forms used in refractory ovens and accordingly no detailed illustration or description of the materials is deemed to be necessary.

The truss structure 12 upon which the oven is supported is not only designed to give the desired support but also to facilitate the changing of the angle of inclination of the oven. This truss structure is here illustrated as being mounted upon a suitable foundation which is generally designated 34, having the upper and lower platforms 36 and 38 respectively. On the lower platform are mounted suitable standards 38 disposed in spaced relation transversely of the oven structure. These standards 38 support a transverse beam 40, resting at their ends in suitable bearing seats or saddles 42 to permit a rocking of the beam.

The truss structure is here illustrated as embodying upper and lower longitudinally extending frame beams 44 beneath the two opposite sides of the oven structure and resting at their lower ends upon and secured to the transverse rocker beam 40. The upper ends of the frame beams 44 are supported from the upper platform 36 by a suitable jack structure 46 by means of which the upper end of the truss structure can be raised or lowered as may be readily apparent to change the inclination thereof and of the oven supported thereon.

The numeral 47 designates an elongate rectangular portion of the oven bottom wall 22, which extends transversely of the oven structure and as shown in FIG. 3, projects at its ends slightly beyond the sides of the oven structure.

Rising from the portion 47 of the bottom wall within the oven is a rearward pier wall 48, which is in spaced relation with a forwardly positioned barrier wall 49 and the ends of these walls 48 and 49 are connected by the short end walls 50 and all of these walls 48, 49 and 50 are spaced from the side and end walls of the oven structure as clearly shown in FIG. 3 and form a hot gas duct 51 which functions in the manner hereinafter described.

The barrier wall 49 extends a substantial distance above the rearward pier wall 48 and terminates in relatively close proximity to the roof wall 20, providing a gas outlet passage 52.

The walls 48, 49 and 50 extend downwardly below the underside of the portion 47 of the oven bottom wall and these walls 48, 49 and 50 are spaced as illustrated in FIGS. 2 and 3, to provide the downwardly directed char discharge passage 53.

To facilitate the downward movement of the char through the passage 53 the inner faces of the walls 48, 49 and 50 are downwardly divergent.

The area enclosed by the walls 48, 49 and 50 forms a soaking pit which leads into the top of the hereinafter described cooler structure previously referred to and generally designated 18.

The portions of the side walls 28 of the oven structure which extend rearwardly from the part 47 of the bottom wall taper rearwardly as shown in FIG. 3, and in this tapered portion the bottom wall 22 is formed in a number of transversely extending steps 54 from each of which rises a number of piers for the support of the hereinafter described oven floor. Certain of these piers, which are designated 55, extend inwardly from the side walls 28 in spaced alignment transversely of the oven as shown in FIG. 3, and between these inwardly extending piers 55 are centrally located piers 56 which are located between the opposing sides of the side wall attached piers and these central piers 56 terminate at their ends short of the side walls, thereby forming a tortuous gas passageway from the hot gas duct 51 to the upper end of the oven structure.

At the upper, top or rear end of the oven structure the rearward wall 24 has leading therefrom the gas discharge neck or conduit 57 which is connected with the stack structure 16 in a particular manner as hereinafter described to facilitate adjusting the angle of inclination of the oven structure.

The truss structure has the bottom wall of the oven supported thereon through the medium of the transverse beams 58, each of which has the underside of a step portion 54 resting thereon with the exception of the two illustrated uppermost beams designated 59, which lie beneath the gas discharge conduit 57.

The piers 48, 55 and 56 support the oven floor which is generally designated 60 and which is formed of silicon carbide, preferably in the form of tiles or slabs. The floor extends the full width of the interior of the oven and the lower edge of the floor rests upon and terminates at the forward side of the pier 48 while the upper end or edge of the floor terminates at the rearward side of the uppermost pier 56.

Between the top edge of the silicon carbide portion of the floor 60 and the rear wall 24, the oven floor is continued on the same slope or at the same inclination by a castable refractory having a low thermal conductivity, which is designated 61.

At the upper end of the oven the roof 20 angles off into a short, more or less horizontal section 20a and as shown in FIG. 2, this section on the inner side converges with the underlying sloping floor and then joins an obtusely angled terminal portion 20b which is only slightly convergent with the underlying refractory portion 61 of the floor forming therewith a feed or inlet throat 62. This low roof area between the portion 20b and the portion 61 of the oven floor forms the hereinafter described preheat area and the raw material to be carbonized is introduced into the upper end of this preheat throat area.

The feed hopper 14 includes the forward and rear walls 63 and 64 respectively together with the side walls 65 which converge to the outlet 66. The numeral 67 designates a bottom section for this hopper which is in line with and has the same slope as the oven floor, joining the floor at the upper or rear edge of the portion 61 thereof. To facilitate the adjustment of the angular or inclined disposition of the oven structure and also maintain a proper feed connection between the outlet 66 of the hopper and the inlet throat 62, there are provided replaceable plates 68 and 69 which can be exchanged as necessary for other plates to obtain the desired coupling. The lateral sides of the hopper below the outlet 66 may be closed by suitable side plates 70 as shown in FIG. 6, secured in any suitable manner as, for example, by welding or other permanent attaching means between the side plates and the sides of the feed hopper bottom 67.

The numeral 71 designates a series of air admission ports in the throat portion 20b of the roof, which open into the preheat area. These ports have connected therewith suitable pipes or conduits 171 by means of which air may be introduced directly from the atmosphere through the dampered arms 172 or air may be introduced under pressure when the arms 172 are closed, from a header or plenum chamber 173, suitable valve means being provided as shown for shutting off communication between the chamber and the ports 71 when required.

In the portion 20a of the roof structure other air inlet ports are formed as indicated at 72 and these also are connected to a plenum chamber 174, by valved pipes or conduits 175 for introducing air under pressure or air may be introduced directly from the atmosphere by means of the dampered inlet arms 176.

Extending through the length of the side walls 28 from a location adjacent to the ports 72 are other air admission ports or openings 73 leading into the combustion chamber generally designated C, and these openings also may be connected with suitable headers or plenum chambers 177 disposed at the sides of the furnace and connected to the ports 73 by valved inlet pipes 178, each of which has leading thereinto a dampered arm 179 through which atmospheric air may be introduced when the valved inlet pipe 178 is closed. The admission of air into the side walls by way of ports 73 minimizes the deposition of carbon in the combustion chamber.

In addition to the air inlet openings above referred to the two ends of the hot gas duct 51 have dampered air inlets as indicated at 74 by means of which air can be introduced into this duct for mixture with the hot gases which enter the duct by way of the passage 52 and pass around the soaking pit to the rear side of the rearward pier 48 to then pass upwardly between the baffle piers 55 and 56 to the gas escape or discharge conduit 57.

The gas discharge stack 16 embodies the vertical conduit portion 75 which is joined at its lower end to the gas and smoke box 76 and this box 76 has a forwardly opening portion 77 into which the rear end of the gas discharge conduit 57 of the oven extends.

The opening or mouth of the box 76 is closed around the end of the conduit 57 by refractory brick 78 which are replaced as necessary when adjustments are made in the angle of inclination of the oven structure.

As shown in FIG. 2, the outlet of the soaking pit formed by the passage 53 and through which passes the char produced in the oven, is connected with the upper end of the water jacketed cooler 18. This cooler is formed in upper and lower sections 18a and 18b respectively. The lower section 18b is stationary or built in a fixed position while the upper section 18a is removable so that it may be replaced by a larger or smaller section as necessary when the angle of inclination of the oven is altered and as is shown more clearly in FIG. 8, the sections are joined by flanges which may be secured together by removable bolts or other suitable means. Also the sections of the cooler which are hollow to form water jackets, are provided with water inlet and outlet pipes, those for the removable upper section 18a being designated 79 and 80 respectively and those for the lower section being designated 81 and 82 respectively.

The char as it moves from the silicon carbide floor 60 into the soaking pit and then down into and through the passageway 83 of the cooler structure, is discharged onto a table 84. In order to protect this table against warping by the heat of material deposited thereon, it is prefered that the table be of hollow construction as illustrated with pipe connections at opposite ends thereof as indicated at 84a by means of which cooling water may be introduced into the table and circulate therethrough. Overlying this table and in line with the open lower end of the passage 83 of the cooler structure is an extractor or discharge mechanism 85 which comprises a rocking shaft 86 carrying a number of pins or fingers 87. As the shaft is rocked by a suitable means, not shown, the pins or fingers moving back and forth across the outlet opening of the cooler push the char first to one side and then to the other onto the table 84 and then from the sides of the table onto the downwardly converging side boards 88 which form a part of and guide the material onto a conveyor 89. This extractor or discharge mechanism together with the table and conveyor structure is more particularly illustrated and described in my co-pending application entitled "Method and Apparatus for Carbonizing Carbonaceous Material,"

It will be readily apparent from the foregoing description that a determination of the slope required for the oven floor to effect the desired rate of gravitational movement of carbonaceous material thereover and in the proper depth to produce char, can be effected by removing the hopper coupling plates 68 and 69, the refractory brick 78 and the upper section 18a of the char cooler structure and then operating the jack 46 to tilt the oven structure as desired.

When the desired tilt is attained the proper coupling plates 68 and 69 are placed in position between the hopper and the inlet throat 62 of the oven and the proper cooler section 18a is fixed in position and also the space between the box 76 and the conduit 51 is refilled with the refractory brick. By making different settings in this manner the proper degree of inclination for the oven floor can be determined for treating material of a particular particle size in such manner as to produce the most satisfactory results.

In starting the operation of the oven, the oven must be preheated to about 1800° F. by filling the feed bin or hopper 14, the bed or combustion chamber and the cooler with low volatile char. For facilitating this preheating the side walls of the oven are provided with access openings 28a through which suitable torches may be introduced for injecting a suitable burning gas such as propane or the like. These access openings are normally closed by the refractory doors 28b mounted in a suitable manner on the oven wall. The discharge mechanism is then started at a reduced rate and the char is withdrawn. The feed bin filled with coal introduces the latter into the oven through the entrance throat 62 as the char is withdrawn and is allowed to move onto the sloping silicon carbide bed to a depth of approximately 4". The temperature within the oven will be approximately 1000° F. and as the coal passes through the throat or preheat area 62 it will be dried and preheated relatively slowly because of the fact that the refractory slope section is a poor conductor of heat and the low roof of the throat section 62 restricts the radiant heat from the combustion zone C.

The small amount of air entering through the openings 71 which are holes of about 2" in diameter in the roof of the preheat or throat section, acts as a purge to move water vapor and volatiles into the combustion zone. As will be readily understood, the combustion zone C is the area enclosed by the roof 20, the sides 28 and the silicon carbide floor tile or slabs with the layer of coal and char on top of the floor. When the coal has moved down past the preheat section or throat area 62 and onto the silicon carbide floor its temperature will be over 1000° F. and gases and vapors will be being evolved. These vapors will start to burn as soon as they come into contact with air. Normally, the air is pulled into the combustion zone C, which is operating at less than atmospheric pressure, through the slot 72 and the dampered openings 73. A negative pressure in the combustion zone is created by the natural draft stack 16. Where, under some circumstances, it may be desirable to operate the furnace under pressure in the combustion zone, a blower can be used to force air into the oven.

By providing the tilting means for the oven the slope of the floor which is specific for each size, shape and type of feed material, can be obtained.

After the coal starts to carbonize and release gasses and vapors the temperature of the oven is gradually raised to about 2300° F. by opening the air dampers controlling the air inlets 73. Additional air is admitted into the hot gas duct 51 through the dampered ports or passages 74 to maintain the 2300° F. for the gasses. The gasses enter the exhaust stack at approximately 1800° F.

It will be seen that the barrier pier or wall 49 guides the char into the passage 53 from the silicon carbide floor and this passage 53 as previously stated, forms the soaking pit which operates to improve the quality and uniformity of the char product by holding the latter at a high temperature for a definite period of time. The water jacketed cooler 18 lowers the temperature of the char from about 1800° F. to about 750° F. Air cooling the low volatile product on the support table 84 further reduces the char temperature to about 130° F.

By the provision of the floor structure in the combustion zone of the oven chamber, formed of silicon carbide which has a very high heat transfer rate as compared to refractory fire bricks, a much higher rate of heat transfer will be produced from the gaseous products of combustion passing beneath the floor 60 into the bed of coal and char on the floor. With this transfer of heat from the gases beneath the floor, through the floor into the bed of coal and char, together with the utilization of radiant heat from the flames in the main combustion chamber. It will be seen that the oven will operate with a high degree of efficiency and the use of the particularly described floor structure will contribute to a greater economy of operation than would be possible by the use of ordinary refractory brick for the floor construction.

As this invention may be embodied in several forms without departing from the spirit or essential characteristics thereof, the present embodiment is therefore illustrative and not restrictive since the scope of the invention is defined in the appended claims, and all changes that fall within the metes and bounds of the claims, or that form their functional as well as conjointly cooperative equivalents, are therefore intended to be embraced by those claims.

I claim:

1. Apparatus for carbonizing carbonaceous material comprising means forming an elongate wide, flat oven structure having a roof wall and a bottom wall, means supporting said oven structure at an inclination from the horizontal whereby the structure has an upper end and a lower end, a floor within the oven supported between said roof wall and bottom wall at approximately the same inclination as the oven structure, said floor being formed of material having a high degree of thermal conductivity, the floor inclination from the horizontal being such as to effect gravitational movement of raw material therealong, the area between said floor and roof forming a combustion chamber, a relatively long material inlet throat extending longitudinally of the oven at the upper end of said floor and formed by the roof angling inwardly toward the floor for a part of its length and then substantially paralleling the floor in close proximity thereto, means for introducing raw material into and through said throat onto said floor, said throat forming a pre-heat area an outlet at the lower end of said floor for discharge of char therefrom and from the oven, means whereby said combustion chamber may be pre-heated, air inlet means for the combustion chamber, means for removing hot gaseous products of combustion from the combustion chamber and conducting the same to and distributing them over the underside of said floor whereby heat is diffused through said floor into carbonaceous material thereon, and means for carrying off products of combustion from beneath the floor.

2. The invention according to claim 1, with air admission means opening into the throat through the roof thereof for effecting drying of the material in the pre-heat area and transmission of moisture from the material into the combustion chamber.

3. The invention according to claim 1, with means enclosing said material outlet forming a duct through which hot gaseous products of combustion are passed for soaking char in the outlet.

4. Apparatus for carbonizing carbonaceous material comprising an oven structure having top, bottom and side walls, and forward and rearward end walls, said bottom wall having a lower end portion having a char discharge opening therethrough, said opening being bordered by an upstanding pier wall, an upstanding barrier wall spaced forwardly from said pier wall and connecting end walls between said pier and barrier walls, the last named walls forming a soaking pit leading to said char discharge opening and the barrier wall being of greater height than the pier wall, a relatively thin floor of material having a high degree of thermal conductivity having a forward end resting upon and terminating at said pier wall for discharge of char into said soaking pit for passage downwardly therethrough to and through said opening, the floor extending rearwardly from said pier wall to and being supported at its rear end upon the rearward end wall, the floor being spaced from the top and bottom walls to provide a combustion chamber thereabove and a hot gas passage space therebeneath, a hot gas duct surrounding the soaking pit forming walls and leading from the combustion chamber to said hot gas passage space, hot gas outlet means leading from the last named space at said rearward end wall, means for receiving char from said soaking pit and for cooling the char, means forming a pre-heat area and material admission throat leading through the rearward end wall above and onto said floor, means whereby said combustion chamber may be pre-heated, air inlet means for the combustion chamber, and means supporting said oven structure at an inclination from the horizontal whereby material introduced into said throat will move by gravity over said floor to said soaking pit.

5. The invention according to claim 4, wherein said supporting means is mounted for turning on a horizontal axis located adjacent to the lowermost portion of and transversely of the structure and means for effecting turning on said axis of the supporting means and the oven structure thereon.

6. The invention according to claim 4, wherein the floor structure in the pre-heat area is a refractory having a low degree of thermal conductivity.

7. The invention according to claim 4, wherein said top wall is substantially parallel with said floor from the forward end of the floor through the major extent of the length thereof and then angles inwardly toward the floor and continues rearwardly in a reduced spaced relation with the floor as the roof of said throat.

8. Carbonizing apparatus comprising an elongate flat oven structure having a top wall, a bottom wall, longitudinal side walls and forward and rearward end walls, spaced upstanding forward and rearward walls within the oven rising from said bottom wall at the forward end thereof and connected by lateral walls and forming a soaking pit area leading downward to a char discharge passage through the bottom wall, an oven floor having a forward end resting upon the forward one of said upstanding walls and extending rearwardly in substantially the entire length of the top wall and joined at its rearward end to said rearward end wall, said floor being vertically spaced from said bottom wall and being formed of a material of high thermal conductivity, means whereby said oven may be pre-heated, air inlet means for the oven, means for introducing material to be carbonized into the oven and onto the top end of said floor, an elongate support structure underlying the oven structure and having the oven bottom wall resting thereon, said support structure having a forward end and a rear end, the supporting structure and oven being disposed at a forward and downward inclination, means supporting the forward end of said support structure and the oven for rocking movement on an axis extending transversely thereof, raising and lowering means supporting the rear end of said support structure and the oven for rocking the support structure and oven on said axis to change the inclination of the oven and consequently the floor thereof, a char receiving and cooling structure below said char discharge passage, and means operatively connecting said structure with said discharge passage.

9. The invention according to claim 8, wherein the said means for introducing material into the oven includes a hopper having an outlet and hollow means for leading material into the oven from the hopper outlet through said rearward end wall of the oven.

10. The invention according to claim 8, wherein said char receiving and cooling structure comprises an upright hollow water jacketed structure having open top and bottom ends and forming with said soaking pit area and char discharge passage, a continuous char delivery passageway.

11. The invention according to claim 10, wherein the said continuous char delivery passageway is of gradually increasing area from top to bottom.

12. The invention according to claim 10, wherein said means for introducing material into the oven includes a hopper having an outlet and hollow means for leading material into the oven from the hopper outlet through said rearward end wall of the oven and said char receiving and cooling structure comprises an upright hollow water jacketed structure having open top and bottom ends and forms with said soaking pit area and char discharge passage, a continuous char delivery passageway, said water jacketed structure including a top removable section for replacement by another section of different dimensions to compensate for changes in the elevation of the forward end of the oven occasioned by rocking the oven on said axis, and the said hollow means for leading material into the oven being constructed for replacement by similar means of different dimensions, also to compensate for said elevational changes.

References Cited in the file of this patent

UNITED STATES PATENTS

| | | |
|---|---|---|
| 847,399 | Brown | Mar. 19, 1907 |
| 1,003,702 | Carter | Sept. 19, 1911 |
| 1,346,515 | Smith | July 13, 1920 |
| 1,939,678 | Evans et al. | Dec. 19, 1933 |
| 2,137,930 | Turk | Nov. 22, 1938 |
| 2,847,369 | Hughes et al. | Aug. 12, 1958 |